Nov. 21, 1961  SHO TAKAHAMA  3,009,406
RELATED FILM TRANSPORT SHUTTER SETTING
AND FILM COUNTER MEANS
Filed March 23, 1959
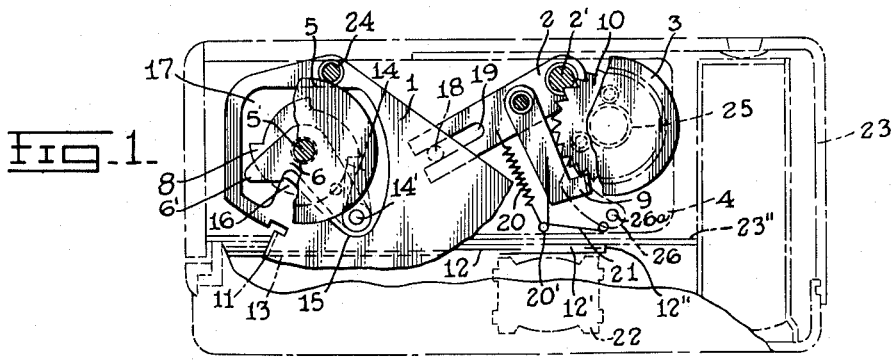
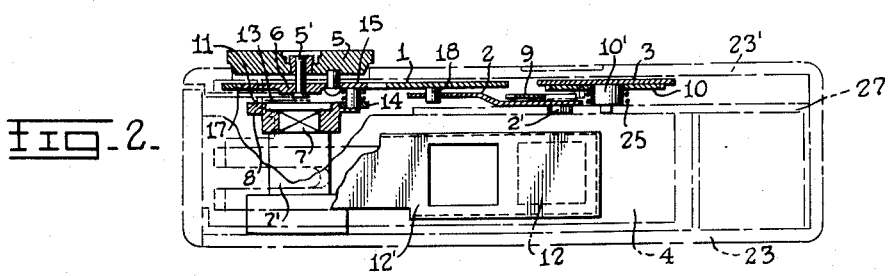
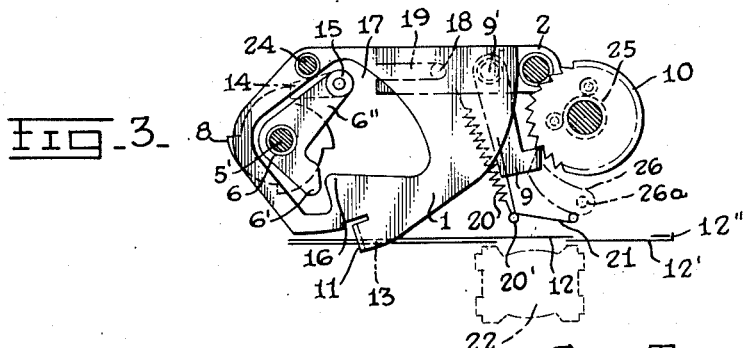
INVENTOR
SHO TAKAHAMA
BY Stanley Wolder
ATTORNEY

United States Patent Office 3,009,406
Patented Nov. 21, 1961

3,009,406
RELATED FILM TRANSPORT SHUTTER SETTING AND FILM COUNTER MEANS
Sho Takahama, Nishinomiya-shi, Japan, assignor to Yashica Co., Ltd., Tokyo, Japan, and Kabushiki Kaisha Konan Kamera Kenkyu-Jo, Hyogo-ken, Japan, a corporation of Japan
Filed Mar. 23, 1959, Ser. No. 801,285
Claims priority, application Japan Apr. 23, 1958
9 Claims. (Cl. 95—31)

The present invention relates to a means for simultaneously cocking the shutter of a camera, transporting the film and advancing a film counter mechanism in a photographic camera.

It is conventional for some years past now to relate film transport, shutter cocking and film counter means in a photographic camera. The difficulty has been, however, that generally speaking such mechanisms have been rather expensive, complex and relatively bulky. Particularly by reason of the advent of the subminiature cameras, the problem of providing simple and inexpensive mechanism of the means mentioned has become acute and important.

It is therefore a purpose of the present invention to provide coordinated film transport, shutter cocking and film counter means of inexpensive and yet accurate construction.

It is a further object of the present invention to provide such means in a form which may be compactly incorporated in a camera.

It is still a further object of the present invention to provide such means in extended substantially coplanar form so that they may be incorporated in a camera along one wall thereof to leave space for the incorporation of other camera subassemblies.

These and other objects are attained in the preferred form of the present invention by connecting a winding knob positioned outside the camera body or housing to a coaxially mounted lever within said body so that as said knob is rotated said lever is displaced from a normal rest position and drives a film transport means and rotates a cocking lever, one portion of which contacts and moves a lever system to advance a counting disk one increment and another contact portion of which simultaneously drives the shutter to a cocked position, spring means being provided to return said lever to the normal rest position upon release of said winding knob.

Other objects and a fuller understanding of the present invention may be had by referring to the following detailed description and claims, taken in conjunction with the accompanying drawings which illustrate preferred embodiments thereof, it being understood that the foregoing statement of the objects of the invention and the brief summary thereof is intended to generally explain the same without limiting it in any manner.

FIG. 1 is a plan view of a camera, embodying the present invention, less important portions thereof being displayed in dot-dash outline, the parts being shown in the uncocked position of the shutter.

FIG. 2 is a sectional vertical elevation of the same.

FIG. 3 is a plan view of the elements illustrated in full line in FIG. 1 but shown in the cocked position of the shutter.

Referring now to the drawing, the preferred form of the invention there illustrated consists of a camera housing 23 to the outside of which is secured a manually operable means in the form of a winding knob 5 by means of a pin 5' to which it is rigidly connected, there being fixed to said pin on the inside of said housing a winding lever 6 in the form of a bell crank. To the longer arm 6" of said lever there is pivotally mounted a winding pawl 14 biased by spring 15 toward pin 5' so as to constantly engage the teeth of a ratchet wheel 8 mounted to said housing to rotate coaxially relative to pin 5'. A winding shaft 7 is fixedly connected to said ratchet and bears fixed about it a film winding drum 7' about which film is wound and thus caused to be transported when said ratchet wheel, shaft and drum rotate in unison, the web of film which is pulled off the storage reel (not shown) thus being carried in conventional fashion across the film frame (which is in communication with the shutter and lens assemblies of the camera) and onto said film winding drum.

A cocking lever 1 in the form of an irregularly shaped sheet is pivotally mounted to camera housing 23 by means of pin 24. A central portion of said lever has been punched out to leave an aperture 17 so that said lever may be positioned substantially coplanar with winding lever 6. A contact member 16 integral with cocking lever 1 extending inwardly into aperture 17 is positioned in the path of the shorter arm 6' of winding lever 6 so that as said lever is moved counterclockwise about pin 5' (as shown in FIG. 1), cocking lever 1 is pushed counterclockwise about pin 24 by the forward edge of said short arm 6'. Since winding knob 5 is connected at the top wall 23' of camera housing 23, cocking lever 1 and winding lever 6 are both positioned within housing 23 substantially parallel to said top wall. There depends from a portion of cocking lever 1 a pin 18 which is positioned to engage the walls of a slot 19 in a counter lever 2 which is pivotally connected by a pin 2' to a median transverse wall 27 positioned across camera housing 23. Counter lever 2 is biased toward the front of camera housing 23 and in opposition to the counterclockwise rotation of cocking lever 1 by means of a return biasing spring 20 which is connected to said lever and to a pin 20' affixed to wall 27. A pawl plate 9 in the form of an L-shaped lever pivoted proximate the free end of its long side by means of pin 9' to counter lever 2 bears at its short side against the teeth of a ratchet wheel 10 being biased thereagainst by means of a spring 21 which is affixed to pin 20'. Said ratchet wheel 10 is pivotally mounted to wall 27 by means of pin 10'. A counter disc 3 lies coaxially atop ratchet wheel 10 and is fixedly secured thereto and contains indicia (not shown) which may be viewed through a transparent window (not shown) in camera housing 23.

A counter hold pawl 26, pivotally mounted to wall 27 by means of pin 26a is positioned to oppose counterclockwise movement of ratchet wheel 10. Ratchet wheel 10 and counter disk 3 along with it are biased to rotate in a counterclockwise position (as seen in FIG. 1) by means of a counter return spring 25.

The cocking of the shutter is initiated by means of a contact member 11 which is in the form of a downturned portion of cocking lever 1 and which, in the normal or uncocked position (as shown in FIG. 1) is in contact with a lug 13 which projects upwardly from the rear shutter plate 12 and drives said shutter plate toward the right as lever 1 is displaced in a counterclockwise direction (as shown in FIG. 1). The righthand edge of rear shutter plate 12 contacts a rearwardly extending flange 12" at the righthand end of front shutter plate 12' and hence, as rear shutter plate 12 is displaced toward the right (against the bias of a shutter spring, not shown) it pushes front shutter plate 12' (against the bias of a second spring, likewise not shown) attached to said shutter plate 12 to the right into a cocked position.

Although the present invention may be used with various types of shutters, the shutter illustrated is a focal plane shutter in which, in the cocked position, the exposure aperture in front shutter plate 12' lies behind the lens system 22 and film frame, and a similar aperture in rear shutter plate 12 lies to the right of the same, the amount of exposure of film positioned behind said film frame being a function of the amount of overlapping of said apertures as said shutter plates are carried toward the left from the cocked position by their respective springs. Such a system is more fully described in my copending application Serial No. 801,290, filed March 23, 1959, entitled "A Shutter for Photographic Cameras."

The elements described coact to cause the simultaneous transportation of the film, advancement of the counter disk and cocking of the shutter in the following manner.

As knob 5 is rotated by reason of its rigid connection to winding lever 6 by means of pin 5′, said lever is caused to rotate from its rest position (as shown in FIG. 1) in a counterclockwise direction, thereby carrying winding pawl 14 upwardly and into contact wtih ratchet wheel 8, causing it and the winding shaft 7 and film winding drum 7′ to rotate along with it in a counterclockwise direction, thus transporting the web or roll of film carried by said drum. At the same time the short end 6′ of winding lever 6 pushes against the contact member 16 extending inwardly from cocking lever 1, causing said cocking lever to rotate in a counterclockwise direction about pin 24 and thus displacing pin 18 in a rearward direction, carrying with it the free end of counter lever 2 which in turn pulls rearward pawl plate 9. Since said pawl plate abuts against the detent of ratchet wheel 10 said wheel and counter disk 3 secured to it is caused to rotate in a counterclockwise direction (as shown in FIG. 1), the turning of knob 5 being continued until said counter disc 3, which contains indicia relating to the film frame number, is advanced one increment, i.e. a distance equivalent to one frame; at the same time contact member 11, extending downwardly from cocking lever 1, engaging the upwardly extending lug 13 of rear shutter plate 12, pushes said plate toward the right, said plate carrying along wth it front shutter plate 12′, into a cocked position. When knob 5 is released, return biasing spring 20, which extends between pin 25 and counter lever 2, acts to rotate counter lever 2 counterclockwise, causing cocking lever 1 to rotate in a clockwise direction which in turn, by reason of the pushing by contact member 16 against short end 6′ of winding lever 6, causes the latter to be displaced in a counterclockwise direction to its normal position.

It must be observed that the return action of spring 20 does not affect the members which are rotated by means of ratchet wheels, i.e. winding shaft 7 or counter disk 3, but merely returns the associated lever system to the normal position.

By reason of the contribution of the present invention, the cooperating members may be stamped out of sheet metal. The assembly of parts is self-evident and, as may be readily appreciated, is not costly. The described system is reliable and, as may be most easily observed from FIG. 2, the levers are arranged within a narrow space to enable advantageous installation within a camera and especially along the wall of a subminiature camera.

Details with respect to the cooperating parts of a camera, in which the embodiment of the present invention here described in detail may be employed, are contained in my copending applications filed March 23, 1959, Serial No. 801,289, now Patent No. 2,960,922, entitled a Flash Synchronizing Device for Cameras, Serial No. 801,288, entitled Device for Preventing the Overwinding of Film and the Premature Release of the Shutter in a Photographic Camera, Serial No. 801,287 entitled A Device for Automatically Returning a Counter and Ejecting a Magazine, and Serial No. 801,286, entitled a Magazine for Photographic Cameras.

Although the present invention has been described with a certain degree of particularity, it is understood that the present disclosure has been made only by way of example and that numerous variations may be employed without transcending the scope of the invention as hereinafter claimed.

What is claimed is:
1. A camera actuating mechanism comprising a shutter member movable between a cocked and uncocked position, a rotatable film take-up drum, a ratchet wheel secured to and coaxial with said take-up drum, a rotatable frame counting member, an actuating knob rockable between advanced and retracted positions, a pawl member engaging said ratchet wheel and operably associated with said knob to reciprocate said pawl and advance said ratchet wheel and drum a predetermined increment during the movement of said knob between its advanced and retracted position, a cocking member rockable between an advanced and retracted position, means effecting engagement between said cocking member and said shutter during advance of said cocking member to surge said shutter member to a cocked position and means coupling said cocking member to said counting member to rotate said counting member a predetermined increment during the movement of said cocking member between its fully advanced and retracted positions.

2. A camera actuating mechanism comprising a shutter member movable between a cocked and uncocked position, a rotatable film take-up drum, a first ratchet wheel affixed to said drum, a rotatable frame counting element, a second ratchet wheel rotatable with said counting element, a pivoted cocking plate rockable in substantially the plane thereof between an advanced and retracted position, said cocking plate having a first abutment element adapted to releasably engage said shutter member and a second abutment member, an actuating knob rotatable between an advanced and retracted position, an actuating lever member rockable with said knob and engaging said second abutment element, a first pawl carried by said actuating lever member and engaging said first ratchet wheel and a second pawl engaging said second ratchet wheel and reciprocable by the rocking of said cocking plate.

3. A camera actuating mechanism comprising a shutter member movable between a cocked and uncocked position, a rotatable film take-up drum, a first ratchet wheel rotatable with said drum, a rotatable frame counting element, a second ratchet wheel rotatable with said counting element, a pivoted cocking plate rockable in substantially the plane thereof between an advanced and retracted position, said cocking plate having an opening formed therein and provided with a first abutment element adapted to releasably engage said shutter and a second abutment element directed inwardly of the edge of said cocking plate opening, an actuating knob rotatable between an advanced and retracted position, an actuating lever member rockable with said knob and registering with said cocking plate opening and engaging said second abutment element, a first pawl carried by said actuating lever member and engaging said first ratchet wheel and a second pawl engaging said second ratchet wheel and reciprocable by the rocking of said cocking plate.

4. A camera actuating mechanism in accordance with claim 3 wherein said cocking plate and said actuating lever are rockable about mutually offset parallel axes.

5. A camera actuating mechanism in accordance with claim 3 including spring means urging said cocking plate toward its retracted position.

6. A camera actuating mechanism in accordance with claim 3 wherein said actuating lever member is defined by a bell crank one of the arms of which engages said second abutment element and the other of the arms of which carries said first pawl.

7. A camera actuating mechanism in accordance with claim 3 including a pin located in said cocking plate, a rockably mounted arm having a forked end slideably engaging said pin, whereby said arm is concurrently movable with said cocking plate between an advanced and retracted position, said second pawl being carried by said arm.

8. A camera actuating mechanism in accordance with claim 7 including a spring means connected to said arm to normally urge said arm and said cocking plate to a retracted position.

9. A camera actuating mechanism in accordance with claim 3 including a hold pawl engaging said second ratchet wheel.

References Cited in the file of this patent

FOREIGN PATENTS

| | | |
|---|---|---|
| 626,104 | Germany | Feb. 20, 1936 |
| 445,943 | Italy | Sept. 16, 1948 |
| 700,614 | Great Britain | Dec. 9, 1953 |